(12) United States Patent
Pesko et al.

(10) Patent No.: US 12,694,714 B2
(45) Date of Patent: Jul. 28, 2026

(54) OPTIMIZATION OF OVERALL EDITING VECTOR TO ACHIEVE TARGET EXPRESSION PHOTO EDITING EFFECT

(71) Applicant: Google LLC, Mountain View, CA (US)

(72) Inventors: Maciej Pesko, Warsaw (PL); Yunyingying Xu, Sunnyvale, CA (US); Ronald Thomas Votel, San Jose, CA (US)

(73) Assignee: Google LLC, Mountain View, CA (US)

( * ) Notice: Subject to any disclaimer, the term of this patent is extended or adjusted under 35 U.S.C. 154(b) by 115 days.

(21) Appl. No.: 18/427,974

(22) Filed: Jan. 31, 2024

(65) Prior Publication Data

US 2025/0245886 A1 Jul. 31, 2025

(51) Int. Cl.
  *G06T 11/00* (2026.01)
  *G06T 7/00* (2017.01)
  *G06T 11/60* (2006.01)
  *G06V 10/774* (2022.01)
  (Continued)

(52) U.S. Cl.
  CPC ............ *G06T 11/60* (2013.01); *G06T 7/0002* (2013.01); *G06V 10/774* (2022.01); *G06V 10/82* (2022.01); *G06V 40/168* (2022.01); *G06V 40/174* (2022.01); *G06T 2207/20081* (2013.01); *G06T 2207/20084* (2013.01); *G06T 2207/30168* (2013.01); *G06T 2207/30201* (2013.01)

(58) Field of Classification Search
  None
  See application file for complete search history.

(56) References Cited

U.S. PATENT DOCUMENTS

| | | | |
|---|---|---|---|
| 9,041,727 B2 * | 5/2015 | Ubillos | G06F 3/0484 |
| | | | 345/594 |
| 10,891,723 B1 * | 1/2021 | Chung | G06N 3/045 |
| 11,120,526 B1 * | 9/2021 | Demyanov | G06T 5/10 |

(Continued)

OTHER PUBLICATIONS

Abdal et al., "StyleFlow: Attribute-conditioned Exploration of StyleGAN-Generated Images using Conditional Continuous Normalizing Flows," CoRR, Submitted on Sep. 20, 2020, arXiv:2008. 02401v2, pp. 1-22.

(Continued)

*Primary Examiner* — Martin Mushambo

(74) *Attorney, Agent, or Firm* — Fish & Richardson P.C.

(57) ABSTRACT

Methods, systems, and apparatus, including computer programs encoded on a computer storage medium, for automatically generating datasets for a particular target expression photo effect. In one aspect, a system comprises receiving a plurality of image pairs, each comprising an original face image and an expressive face image representative of a target expression photo editing effect, generating an initial overall editing vector, wherein generating the initial overall editing vector comprises processing each image pair using a style space encoder model to generate an embedding of the original face image and an embedding of the expressive face image in an embedding space, optimizing the initial overall editing vector in accordance with one or more optimization criteria to generate an optimized overall editing vector, and applying the optimized overall editing vector to an input face image to generate a target expression face image that has the target expression photo editing effect.

24 Claims, 6 Drawing Sheets

(51) Int. Cl.
   *G06V 10/82*          (2022.01)
   *G06V 40/16*          (2022.01)

(56)                    References Cited

U.S. PATENT DOCUMENTS

| | | | | | |
|---|---|---|---|---|---|
| 11,631,186 | B2 * | 4/2023 | Afridi | | G06T 7/45 |
| | | | | | 382/156 |
| 11,935,166 | B2 * | 3/2024 | Chen | | G06T 7/337 |
| 2019/0005305 | A1 * | 1/2019 | Huang | | G06T 7/11 |
| 2019/0005313 | A1 * | 1/2019 | Vemulapalli | | G06N 3/0475 |
| 2019/0026870 | A1 * | 1/2019 | Hu | | G06T 5/77 |
| 2019/0236814 | A1 * | 8/2019 | Shlens | | G06F 18/40 |
| 2019/0370936 | A1 * | 12/2019 | Zhang | | G06T 3/40 |
| 2020/0219274 | A1 * | 7/2020 | Afridi | | G06N 3/04 |
| 2020/0242823 | A1 * | 7/2020 | Gehlaut | | G06T 11/40 |
| 2020/0294294 | A1 * | 9/2020 | Petriv | | G06N 3/0464 |
| 2021/0209464 | A1 * | 7/2021 | Bala | | G06N 3/094 |
| 2022/0092835 | A1 * | 3/2022 | Wang | | G06V 40/166 |
| 2022/0100831 | A1 * | 3/2022 | Moreno | | H04W 12/06 |
| 2022/0148244 | A1 * | 5/2022 | Ko | | G06N 3/045 |
| 2022/0172322 | A1 * | 6/2022 | Prins | | G06T 3/40 |
| 2022/0222897 | A1 * | 7/2022 | Yang | | G06V 40/16 |
| 2022/0245814 | A1 * | 8/2022 | Li | | G16H 40/63 |
| 2022/0383570 | A1 * | 12/2022 | Ling | | G06T 7/11 |
| 2022/0383906 | A1 * | 12/2022 | Mann | | G06V 10/56 |
| 2023/0081982 | A1 * | 3/2023 | He | | G06V 10/751 |
| | | | | | 382/157 |
| 2023/0162407 | A1 * | 5/2023 | Kalarot | | G06V 40/172 |
| | | | | | 382/118 |
| 2023/0316587 | A1 * | 10/2023 | Ghebremusse | | G06T 9/002 |
| | | | | | 345/619 |
| 2023/0316607 | A1 * | 10/2023 | He | | G06V 40/168 |
| | | | | | 382/308 |
| 2023/0319223 | A1 * | 10/2023 | Naruniec | | H04N 5/272 |
| | | | | | 348/239 |
| 2023/0325934 | A1 * | 10/2023 | Ding | | G06F 18/214 |
| | | | | | 705/4 |
| 2023/0342893 | A1 * | 10/2023 | Hinz | | G06T 5/60 |
| 2023/0377230 | A1 * | 11/2023 | Stannus | | G06T 7/50 |
| 2024/0161465 | A1 * | 5/2024 | He | | G06V 10/764 |
| 2024/0193207 | A1 * | 6/2024 | Seyed Fathi | | G06F 16/783 |
| 2024/0420288 | A1 * | 12/2024 | He | | G06V 10/764 |

OTHER PUBLICATIONS

Bai et al., "Towards Arbitrary Text-driven Image Manipulation via Space Alignment," CoRR, Submitted on Sep. 21, 2023, arXiv:2301. 10670v3, pp. 1-10.

Härkönen et al., "GANSpace: Discovering Interpretable GAN Controls," CoRR, Submitted on Dec. 14, 2020, arXiv:2004.02546v3, pp. 1-29.

Karras et al., "A Style-Based Generator Architecture for Generative Adversarial Networks," CoRR, Submitted on Mar. 29, 2019, arXiv:1812. 04948v3, pp. 1-12.

Nitzan et al., "Face Identity Disentanglement via Latent Space Mapping," CoRR, Submitted on Oct. 19, 2020, arXiv:2005. 07728v3, pp. 1-23.

Pan et al., "Drag Your GAN: Interactive Point-based Manipulation on the Generative Image Manifold," CoRR, Submitted on May 18, 2023, arXiv:2305.10973v1, pp. 1-11.

Pan et al., "Drag Your GAN: Interactive Point-based Manipulation on the Generative Image Manifold," Paper, Presented at Proceedings of the ACM Conference: SIGGRAPH 2023, Los Angeles, CA, Aug. 6-10, 2023, 11 pages.

Patashnik et al., "StyleCLIP: Text-Driven Manipulation of StyleGAN Imagery," CoRR, Submitted on Mar. 31, 2021, arXiv:2103. 17249v1, 18 pages.

Radford et al., "Learning Transferable Visual Models From Natural Language Supervision," CoRR, Submitted on Feb. 26, 2021, arXiv:2103. 00020v1, pp. 1-48.

Sagar, "Laplacian and its use in Blur Detection," May 21, 2020, retrieved on Feb. 3, 2025, retrieved from URL<https://medium.com/ @sagardhungel/laplacian-and-its-use-in-blur-detection-fbac689f0f88>, 9 pages.

Shen et al., "Closed-Form Factorization of Latent Semantics in GANs," CoRR, Submitted on Apr. 3, 2021, arXiv:2007.06600v4, pp. 1-9.

Shen et al., "Interpreting the Latent Space of GANs for Semantic Face Editing," CoRR, Submitted on Mar. 31, 2020, arXiv:1907. 10786v3, pp. 1-12.

Voynov et al., "Unsupervised Discovery of Interpretable Directions in the GAN Latent Space," CoRR, Submitted on Jun. 24, 2020, arXiv:2002.03754v3, 15 pages.

Yan et al., "Attribute-Specific Manipulation Based on Layer-Wise Channels," CoRR, Submitted on Feb. 18, 2023, arXiv:2302. 09260v1, pp. 1-34.

* cited by examiner

Input Image + Optimized Overall Editing Vector 560

Input Image + Initial Overall Editing Vector 540

Input Image 520

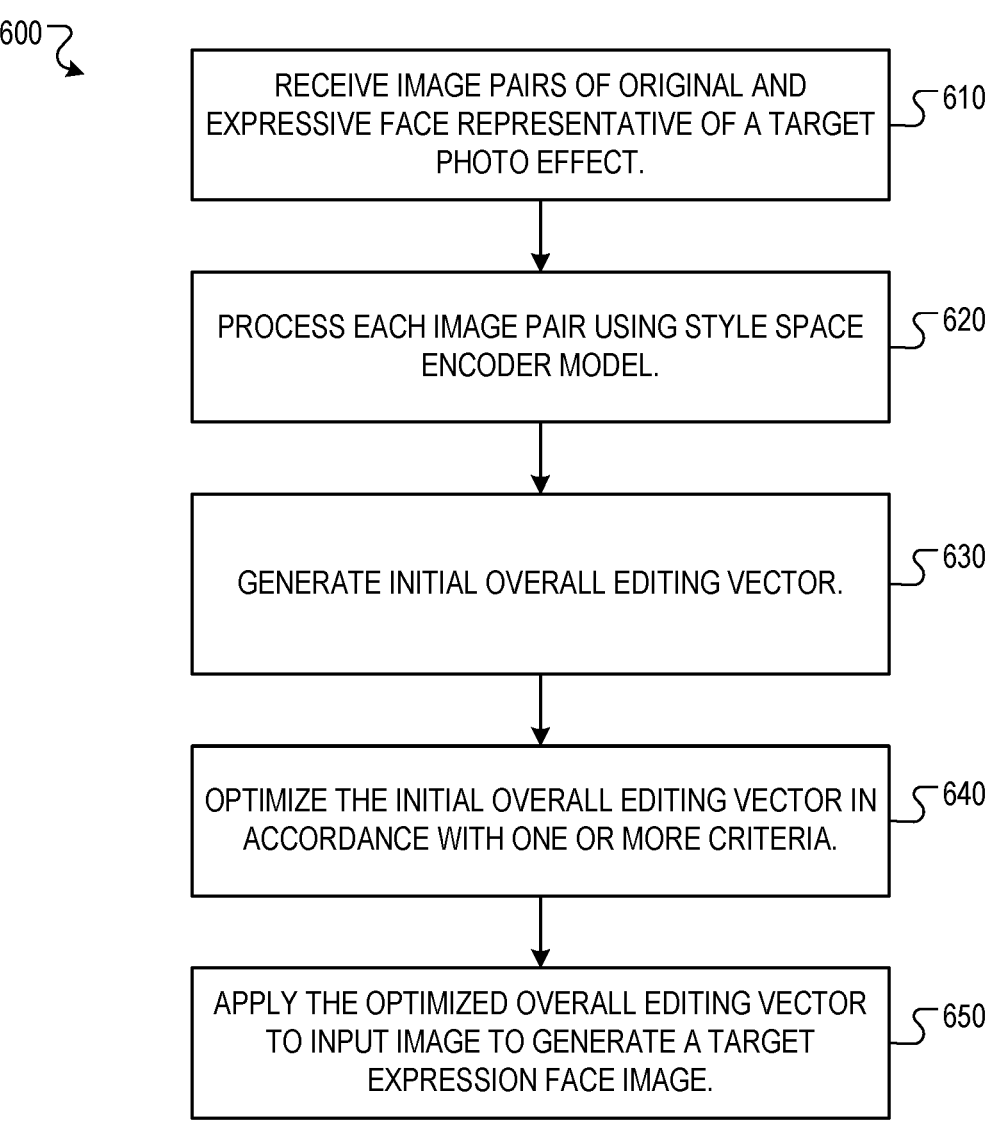

600

RECEIVE IMAGE PAIRS OF ORIGINAL AND EXPRESSIVE FACE REPRESENTATIVE OF A TARGET PHOTO EFFECT.          610

PROCESS EACH IMAGE PAIR USING STYLE SPACE ENCODER MODEL.          620

GENERATE INITIAL OVERALL EDITING VECTOR.          630

OPTIMIZE THE INITIAL OVERALL EDITING VECTOR IN ACCORDANCE WITH ONE OR MORE CRITERIA.          640

APPLY THE OPTIMIZED OVERALL EDITING VECTOR TO INPUT IMAGE TO GENERATE A TARGET EXPRESSION FACE IMAGE.          650

FIG. 6

OPTIMIZATION OF OVERALL EDITING VECTOR TO ACHIEVE TARGET EXPRESSION PHOTO EDITING EFFECT

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that can automatically generate datasets for a particular target expression photo effect.

In particular, the system can automatically produce target expression datasets that can be used to train one or more downstream models to generate a particular target expression photo effect for a given input image.

In this specification, the target expression photo effect is an effect that can be applied to achieve a target facial expression. In particular, a target expression can refer to a facial expression of a person, animal, avatar, or other agent depicted in an image, e.g., an angry, smirking, happy, or sad facial expression. In some cases, the target facial expression can be an extreme or theatrical facial expression that can evoke amusement.

According to a first aspect there is provided a method for receiving a plurality of image pairs, wherein each image pair comprises an original face image of a face and an expressive face image representative of a target expression photo editing effect applied to the face, generating an initial overall editing vector for each image pair in the plurality of image pairs, wherein generating the initial overall editing vector comprises processing the image pair using a style space encoder model to generate an embedding of the original face image and an embedding of the expressive face image in an embedding space, optimizing the initial overall editing vector in accordance with one or more optimization criteria, and applying an optimized overall editing vector to an input face image to generate a target expression face image that has the target expression photo editing effect.

Particular embodiments of the subject matter described in this specification can be implemented so as to realize one or more of the following advantages.

The techniques of this specification provide a robust method for automatically generating target expression face images for any identified target face expression. Rather than relying on photo designers to edit a large number of original images to create a target expression dataset, the system can automatically process a small set of image pairs containing an original and expressive face image representative of the target expression photo editing effect to generate an optimized overall editing vector that encodes instructions, e.g., a direction and magnitude of a style space change, that can be automatically applied to a given input face image to impart the target expression photo editing effect.

The optimized overall editing vector is generalizable, e.g., it can be applied to any number of original images. In particular, the system can apply the optimized overall editing vector to a set of original images, e.g., larger number than the small set used to generate the optimized overall editing vector, to automatically generate corresponding target expression face images that can be included in a dataset for the target face expression, thereby saving the user time and effort that would have been necessary to create the dataset on each face without the optimized overall editing vector. In particular, the target expression photo editing effect can be applied without the need for further user effort and involvement, thereby decreasing the time and resources needed to create the dataset, e.g., using an additional image editing technique. As an example, the system does not require a user further editing each image, e.g., with Style-Clip, a generative adversarial network that can process user-inputted text specifying a change to facial features, or DragGAN, a generative adversarial network that can update the output image based on a user dragging one or more identified control points of a face image.

Additionally, the techniques of this specification enable direct control of the optimization of the overall editing vector, e.g., based on the set of losses included in the gradient optimization process. In a particular example, the gradient optimization process can include reconstruction and perceptual losses as well as one or more specialized auxiliary loss functions that can ensure the generated target expression face image aligns with a set of one or more optimization criteria, e.g., quality criteria with respect to image sharpness, the presence of artifacts, and expected face transitions for one or more face features based on the target expression photo editing effect, etc. In particular, the set of losses can be weighted by a corresponding set of loss weight parameters that can be automatically tuned using a hyper-parameter search based on the set of one or more optimization criteria. As another example, the gradient optimization process can involve tunable loss models that can enable user insight and control over the optimization of the overall editing vector, e.g., through direct user feedback with respect to an intermediate generated expression image. In some cases, the tuning of the gradient optimization process can enable the generation of a target face expression different from the target expression photo editing effect represented by the expressive face image, providing flexibility to generate more intensely expressive, e.g., extreme or theatrical, photo expression effects.

By generating and then applying the optimized editing vector to generate target expression face images, the system can create a scalable, e.g., parallelizable, target expression dataset generation pipeline that removes the need for any direct user intervention, e.g., after the optimized editing vector is generated. Since direct user intervention is not required, the system can distribute available computational resources and deploy multiple pipelines to create multiple target expression datasets. More specifically, the system can receive multiple image pair datasets, each representative of a different target expression photo editing effect and deploy respective pipelines for the creation of each respective target face expression datasets in parallel.

Furthermore, the created target face expression datasets can be used to train at-edge on-device models, e.g., resource-constrained models, to generate target expression face images with high fidelity in real-time. Generally, on-device models can process inputs faster than cloud-based models, e.g., in real-time, since they are smaller, e.g., have less trainable parameters, and do not have access to as many computational resources. However, this trade-off in size and resource scale can result in lower quality outputs, e.g., lower quality images for image generation tasks. The optimized overall editing vector can impart such a high-quality change to each image included in the target photo expression dataset, e.g., based on the set of one or more optimization criteria evaluated during gradient optimization, e.g., with respect to image sharpness, the presence of artifacts, and expected face transitions, etc., that it is possible to train a smaller, faster at-edge model that can yield a high-quality target photo expression effect. That is, making use of the optimized overall editing vector results in a training dataset that is significantly larger, that is of significantly higher quality, or both, than datasets generated using conventional techniques, allowing the at-edge model to be trained to match the performance of larger, in the cloud models.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram of an example process for generating an optimized overall editing vector.

Like reference numbers and designations in the various drawings indicate like elements.

DETAILED DESCRIPTION

Figure 1:
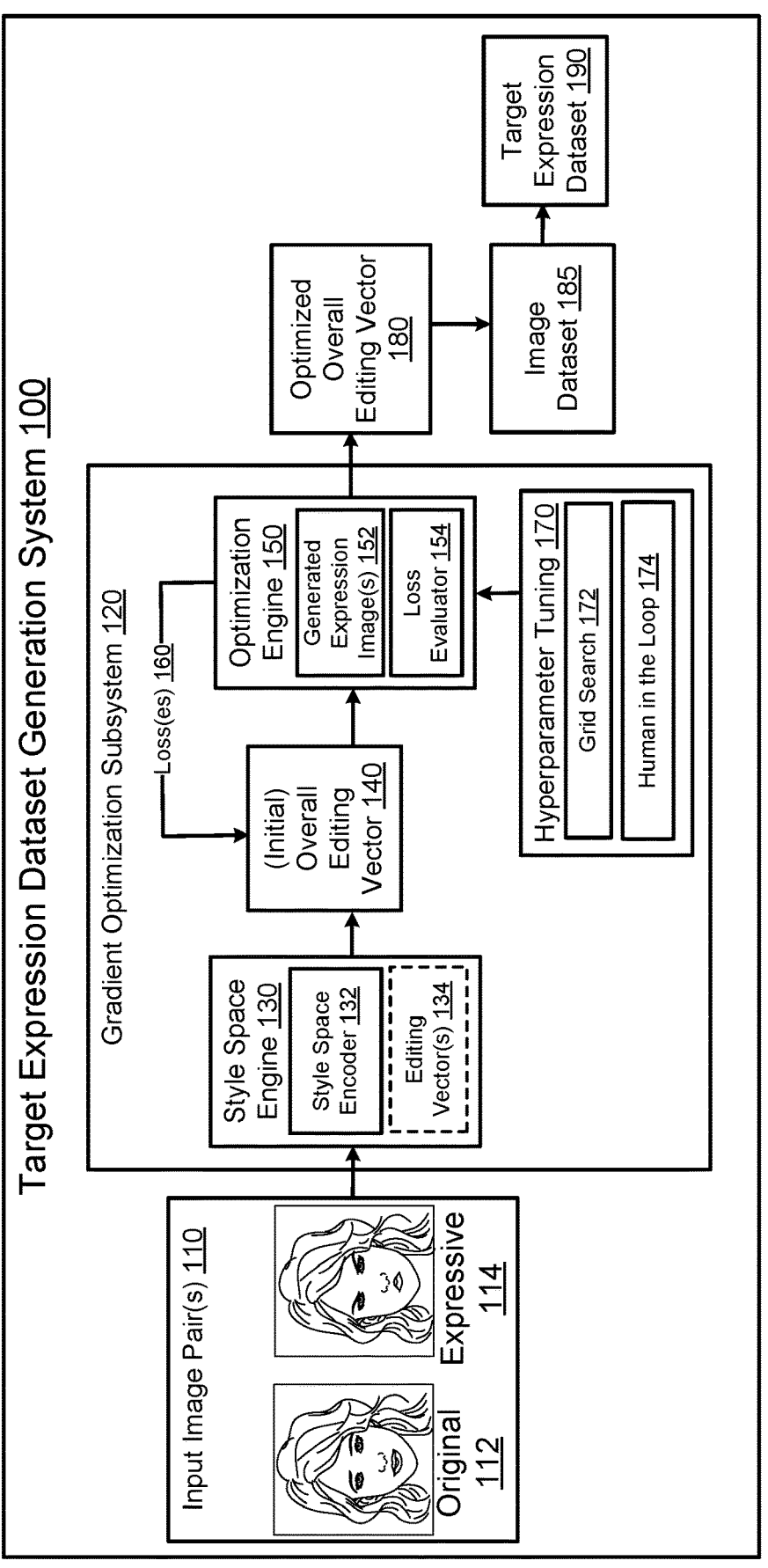
FIG. 1 is a system diagram of an example target expression dataset generation system.

FIG. 1 shows an example target expression dataset generation system 100. The target expression dataset generation system 100 is an example of a system implemented as computer programs on one or more computers in one or more locations in which the systems, components, and techniques described below are implemented.

The system 100 can automate a concept-to-training process to create one or more target expression face images. In particular, the system can identify a target expression, generate an optimized overall editing vector 180, e.g., a vector that can impart the intended target expression photo editing effect on an input image, and apply the optimized overall editing vector to the input face image to generate a target expression face image. In some cases, the overall editing vector can be applied to an obtained dataset of faces to create a dataset of paired original and target expression face images.

The target expression dataset generation system 100 can process one or more input image pairs 110, e.g., of an original face image 112 and an expressive face image 114, e.g., an image representative of a target expression photo editing effect applied to the face, to generate an initial overall editing vector 140.

In particular, the one or more input image pairs 110 can be a portion or the entirety of a face image dataset that includes tens or hundreds of face images. As an example, the system 100 can require certain criteria to be met by the one or more input image pairs 110 obtained from the dataset, e.g., such that the input image pairs 110 are as varied as possible, e.g., include faces with different skin tones, accessories, hair colors, facial hair variants, different head poses, skin details, and teeth exposure.

In some cases, the dataset that the system obtains the one or more input image pairs 110 from can contain only neutral face images. In other cases, the dataset the system obtains can contain images of faces that have a different expression than the target face expression or a less expressive expression than the target face expression. In both cases, the expressive image 114 that represents the target photo editing effect can be produced using a digital photo editing technique, e.g., designers can photoshop the original face image 112 using photoshop software to edit desired parts of the original image 112 in accordance with the target photo expression effect.

In some cases, the system can receive image pairs 110 that have been previously standardized, e.g., such that the original image 112 and expressive image 114 are the same size, pixel resolution, sharpness, color grading, clarity, and brightness. As another example, the image pairs 110 can be standardized to ensure that the faces cover approximately 60-70% of the image, that the images in the pair are aligned in the same way, and that facial details are preserved, e.g., in the case that the target facial expression is not supposed to change the facial details.

The system 100 can process the one or more image pairs 110 using a gradient optimization subsystem 120 to generate and optimize an overall editing vector. The optimized overall editing vector 140 can have a direction and magnitude characteristic of the particular target photo expression.

The system can generate and optimize the overall editing vector in an embedding space, e.g., a multi-dimensional vector space that can be used to condense information from the one or more image pairs 110. In particular, the embedding space can be an embedded style space, e.g., an embedding space that provides a representation of different distinct visual attributes, e.g., styles, of a processed image. In particular, each dimension of the multi-dimensional embedding space can be a style dimension that corresponds with a particular style, and embeddings within the embedded style space can contain values indicative of which particular styles are more or less represented by the processed image.

In particular, the gradient optimization subsystem 120 can process the one or more image pairs 110 using the style space engine 130 to embed the original image 112 and the expressive image 114, e.g., using a style space encoder 135. The style space encoder 135 can have any appropriate machine learning architecture, e.g., a neural network, that can be configured to process an input pair of images 110 and embed the pair 110 in the embedded style space. In particular, the style space encoder 135 can have any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers).

In some cases, the style space encoder model 132 can be a subset of a pretrained style transfer neural network and the resultant embedding can be an output of a hidden layer of the style space encoder model 132. In particular, the style space encoder 135 can be an encoder of a pretrained style transfer neural network. As an example, the style space encoder 135 can be a subset of a StyleGAN model, a style-based generative adversarial network specialized for synthesizing high-quality images, as described in Karras, T.: "A Style-Based Generator Architecture for Generative Adversarial Networks". For example, the subsystem can generate and optimize the overall editing vector in the style space embedding of the pretrained StyleGAN.

In particular, the style space encoder 135 can include a first encoder-decoder block of the StyleGAN model. More specifically, the style space encoder 135 can be the encoder-decoder block that embeds input images into style space, e.g., the encoder-decoder block that processes an input image, e.g., the original 112 or expressive 114 image, to embed the image into an intermediate latent space, e.g., the w-space that separates inputs for each convolutional layer, and the decoder that maps the intermediate embedding to style space, e.g., using affine transformations.

More specifically, the style space engine 130 can embed the input image pairs 110 and can identify a difference between the original image 112 and expressive image 114 in the embedding space.

In some cases, identifying the difference can include generating respective editing vector(s) 134 for each processed input image pair 110. In particular, the style space engine 130 can process a dataset of N input image pairs 110 to generate N editing vector(s) 134 that can be combined as the initial overall editing vector 140.

In particular, the editing vector 134 for a given pair 110 can characterize a distance between the embeddings of the input image pair 110 in the embedding space, e.g., the style space, as the difference. As an example, the style space engine 130 can subtract the two embeddings to generate a difference editing vector as the editing vector 134 for each pair of images 110. In this case, the style space engine 130 can calculate a pointwise average to generate a mean difference editing vector as the initial overall editing vector 140, as will be described in more detail in FIG. 2.

In other cases, generating the initial overall editing vector 140 for the dataset can involve generating the initial overall editing vector 140 for all N input image pairs 110, e.g., the system can identify the difference between the embeddings of the original images and the embeddings of the expressive images in the image pairs 110, instead of respectively calculating respective editing vectors 134 for each image pair 110.

As an example, the style space engine 130 can determine a normal vector separating a hyperplane between the embeddings of the original face images and the embeddings of the expressive face images as the initial overall editing vector 140. In particular, the style space engine 130 can perform a linear separation method, e.g., using support vector machine classification, to generate a linear separation editing vector as the initial overall editing vector 140. An example method for generating a linear separation overall editing vector as the initial overall editing vector 140 will be covered in more detail in FIG. 3.

The system 100 can then optimize the initial overall editing vector 140 using an optimization engine 150, e.g., the system can evaluate the initial overall editing vector 140 with respect to a set of one or more optimization criteria, and then update the vector 140 to better satisfy the criteria over a sequence of iterations, as will be described in more detail in FIG. 4. In particular, the optimization criteria can be a set of quality criteria that characterize the quality of a generated expression image 152.

More specifically, the subsystem 120 can apply the overall editing vector 140 to the embedding of the original image(s) in style space to generate corresponding generated expression embedding(s) and can decode the generated expression embedding(s) into corresponding generated expression image(s) 152 using a decoder model, e.g., a decoder configured to process the resultant generated expression embedding and generate a generated expression image 152. The gradient optimization training subsystem 120 can use the optimization engine 150 to provide one or more losses 160, e.g., using a loss evaluator 154, to optimize the overall editing vector 140 based on the generated expression image(s) 152. In some cases, this can involve comparing the generated expression image(s) 152 to the expressive face image(s) 114. In other cases, this can involve calculating one or more quality metrics to assess the generated expression image(s) 152.

In particular, the loss evaluator 154 can include at least one of a loss calculator that can compute different losses and a set of one or more loss models configured to assess a different quality aspect of the generated expression image(s) 152. The loss evaluator can generate losses 160, and the gradient optimization training subsystem 120 can combine the losses 160 and steer the overall editing vector 140 with respect to an objective function, as will be described in greater detail in FIG. 4.

In particular, the loss(es) 160 generated by the loss evaluator 154 can introduce tunable aspects of the gradient optimization process. More specifically, the losses 160 can be weighted by a corresponding set of one or more loss weight parameters, which can be tuned using hyperparameter tuning 170, e.g., the values of the set of loss weight parameters can be updated in accordance with the set of one or more optimization criteria. As an example, if the generated expression image(s) 152 do not align with a sharpness criterion, the gradient optimization subsystem 120 can increase the loss weight parameter corresponding to a loss indicative of a measure of sharpness in order to enhance the sharpness of the generated expression image(s) 152.

In the particular example depicted, the gradient optimization subsystem 170 can be tuned using an automated process, e.g., a grid search 172, a human-in-the-loop process 174, or both. In the case in which the loss evaluator 154 includes one or more loss models, the loss models can include additional hyperparameters for hyperparameter tuning. In particular, since effect quality evaluation can be subjective, a subset of the loss models can enable direct user control over the optimization of the overall editing vector 140, e.g., human perception can be an effective manner of evaluating the generated expression images 152. An example hyperparameter tuning process that can enable direct user control will be covered in more detail in FIG. 4.

After a number of gradient optimization iterations or a termination criterion is met, e.g., a termination criterion based on the total loss of the combined loss(es) 160, the gradient optimization subsystem 120 can generate the optimized overall editing vector 180. In particular, the subsystem 120 can optimize the editing vector 140 over a number of gradient optimization iterations to ensure any aesthetic biases introduced by the input image pair(s) 110, which can lead to unwanted effects if the overall editing vector 140 is applied to images without optimizing, are corrected for in the optimized editing vector 180.

As a result of the optimization, the optimized overall editing vector 180 represents a high-quality instruction, e.g., a style space embedding that characterizes a magnitude and direction of change that can be applied to the embedding of an input image to generate a target expression image that aligns with the set of one or more optimization criteria used by the optimization engine 150 to evaluate the overall editing vector 140 during gradient optimization.

In some cases, the optimized overall editing vector 180 can be postprocessed using one or more postprocessing techniques, e.g., trimming, clipping, or normalization. For example, the system 100 can take the top M values of the vector and zero out the values corresponding to the remaining style dimensions. As another example, the system 100 can zero out the values corresponding to style dimensions that are under a certain value threshold. As yet another example, the optimized overall editing vector 180 can be normalized, e.g., into a unit vector, or for the purpose of norm trimming, e.g., to trim a certain amount of the length of the vector, e.g., 50%, 75%, or 90%.

The target expression dataset generation system 100 can then apply the optimized overall editing vector 180 to one or more input images to generate corresponding target expression face images. In the particular example depicted, the system 100 can apply the optimized vector 180 to an image dataset 185 to create a target expression dataset 190, e.g., a high-quality dataset of original and generated target expression image pairs. In particular, the system 100 can embed the one or more input images included in the image dataset 185 in a style space, e.g., using the style space encoder 132, apply the optimized overall editing vector 180 to the embedding of the input images, and can decode the result using a decoder model, e.g., the same decoder model used to generate the generated expression image(s) 152.

The target expression dataset 190 can then be used for one or more downstream tasks.

In the particular example depicted, the system can train one or more downstream models for deployment that can be used to generate the intended target photo expression for input images using the target expression datasets 190. As another example, the system can provide the target expression dataset 190 to another training system to train the one or more downstream models.

In some cases, the downstream models can be deployed on resource-constrained at-edge devices. More specifically, the target expression dataset generation system 100 can create a target expression dataset 190 that can be used to train an on-device model, e.g., a student model, to process input images and generate the target expression with high-fidelity on the user-device. In particular, the on-device model can be smaller, e.g., have less parameters, than the style-space encoder 132 and still learn a representative high-quality mapping to produce the target expression photo effect using the target expression dataset 190. The quality of the created target expression dataset 190 and the impact that the quality has on training an example at-edge on-device model will be described in further detail in FIG. 5.

As another example, the target expression dataset generation system 100 can be run at scale, e.g., as part of a distributed pipeline. In particular, multiple copies of the gradient optimization subsystem 120 can be run in parallel to generate corresponding multiple optimized overall editing vectors 180 for multiple target photo editing effect expressions, e.g., the system can receive multiple image pair datasets, each representative of a different target expression photo editing effect, and deploy respective subsystem 120 pipelines for the generation of respective optimized overall editing vectors 180 that can be applied to the image dataset 185 to create respective target face expression datasets in parallel. In particular, the system can produce multiple datasets, e.g., of paired original and angry, smirking, happy, sad face images, etc., and, in some cases, can configure and train respective downstream models to process an input image and generate a respective specific target expression photo effect.

Figure 2:
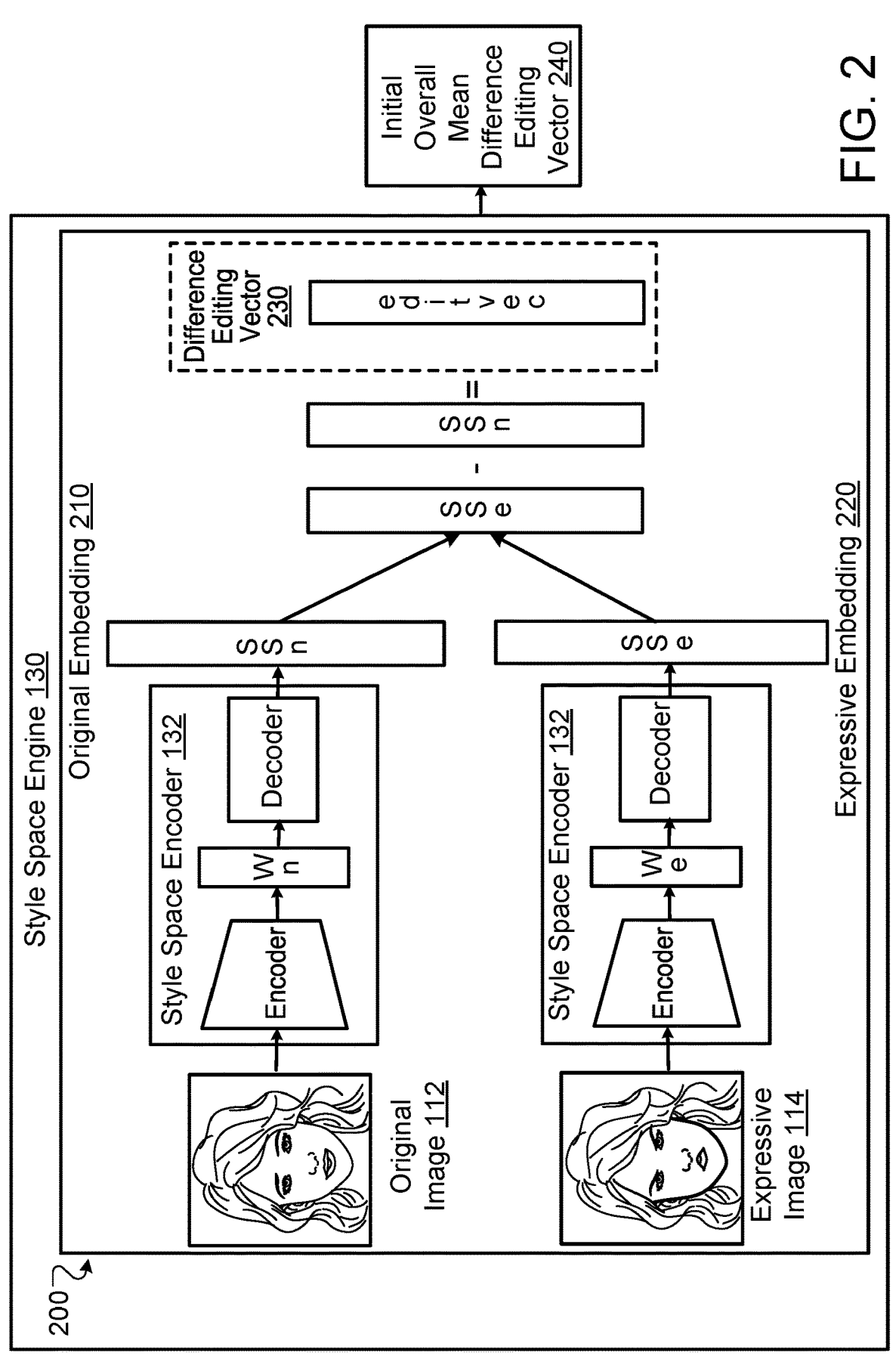
FIG. 2 is a block diagram that demonstrates an example method for generating a mean difference editing vector as the overall editing vector using a style space engine.

FIG. 2 is a block diagram that demonstrates an example method for generating a mean difference editing vector as the initial overall editing vector using a style space engine. As an example, the style space engine 130 of FIG. 1 can perform the mean difference method 200 to generate the mean difference editing vector as the initial overall editing vector 140.

In particular, the style space engine 130 can process the original image 112 and the expressive image 114 using the style space encoder 132 to generate an embedding of the original image ("original embedding") 210 and an embedding of the expressive image ("expressive embedding") 220, e.g., in the style space. While FIG. 2 depicts two style space encoders, the encoders can be the same model, e.g., the system can maintain one style space encoder 132 to embed images in the same embedding space. More specifically, the style space encoder 132 can process the two images in the pair of images sequentially to generate the embeddings 210 and 220, e.g., in any order or in a particular order.

In the particular example depicted, the style space encoder 132 is the first encoder-decoder block of a pretrained Style-GAN, e.g., the block that encodes an input image into an intermediate latent space, e.g., the w-space that separates inputs for each convolutional layer, and the decoder that maps the intermediate embedding to style space, e.g., using affine transformations. In this particular case, the dimension of the original embedding 210 and the expressive embedding 220 is 5952, e.g., the dimensionality of the style space of a StyleGAN.

The style space engine 130 can process each of the one or more image pairs including a corresponding respective original 112 and expressive image 114 to generate respective editing vectors 134, e.g., the style space engine 130 can employ the method 200 to generate an editing vector 134. In the particular example depicted, the style space engine 130 can characterize a difference between the original embedding 210 and the expressive embedding 220, e.g., by subtracting the two embeddings. As an example, the style space engine can subtract the original embedding 210 from the expressive embedding 220 to generate a respective difference editing vector 230.

The style space engine can then take the pointwise mean of the difference editing vectors 230 generated for each image pair to generate the initial overall mean difference editing vector 240, e.g., by computing:

$$\frac{1}{k}\sum_{i=0}^{k}(SS_{e,i} - SS_{n,i}),$$

where $SS_{e,i}$ is the style space embedding calculated for the i-th expressive image using the style space encoder, $SS_{n,i}$ is the style space embedding calculated for the i-th original image using the style space encoder, and k represents the number of image pairs. The initial overall mean difference editing vector 240 can then be optimized using gradient optimization, as will be described in more detail in FIG. 4.

Figure 3:
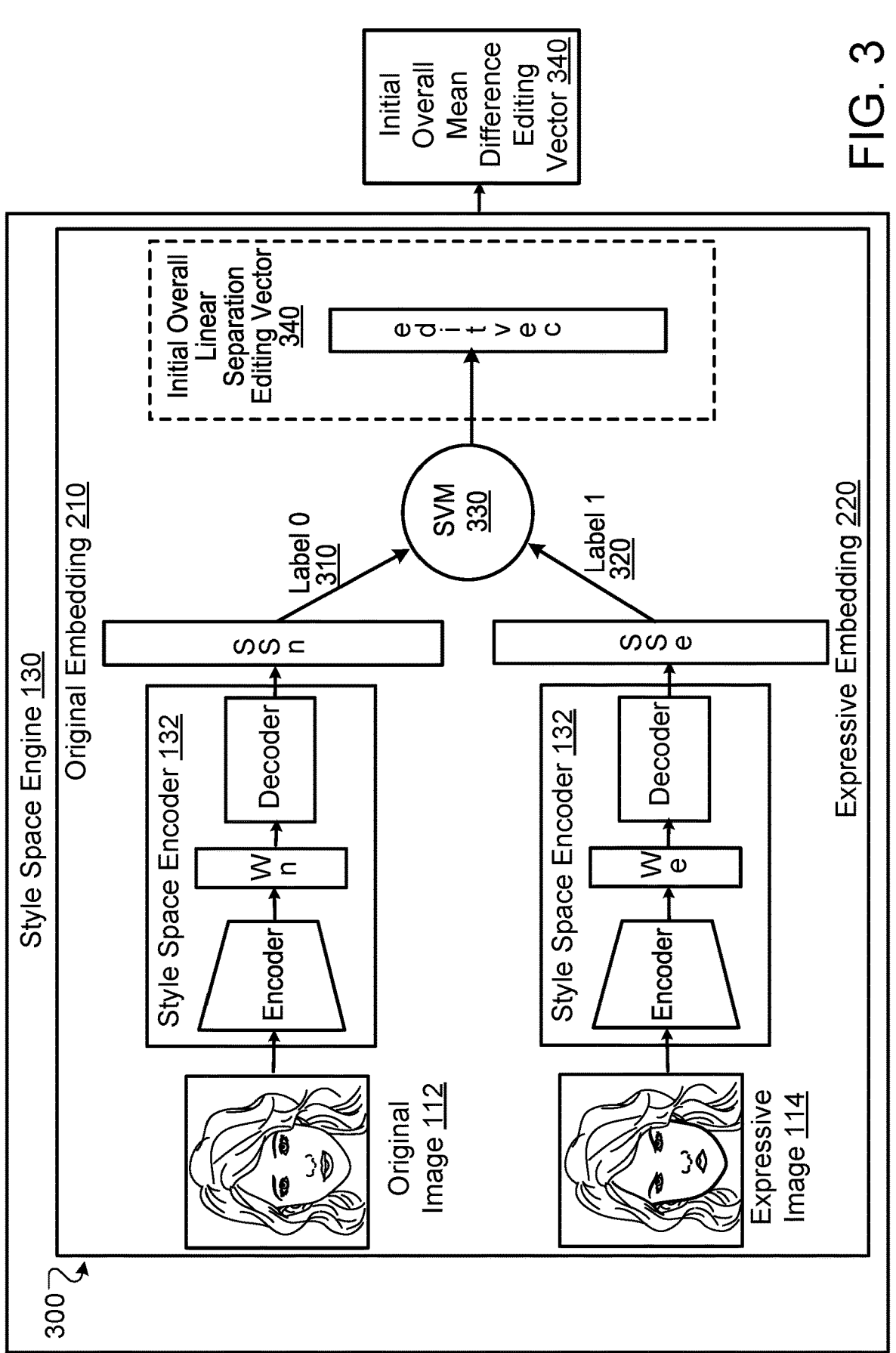
FIG. 3 is a block diagram that demonstrates an example method for generating a linear separation editing vector as the overall editing vector using a style space engine.

FIG. 3 is a block diagram that demonstrates an example method for generating a linear separation editing vector as the initial overall editing vector using a style space engine. As an example, the style space engine 130 of FIG. 1 can perform the linear separation method 300 to generate the linear separation overall editing vector as the initial overall editing vector 140.

As depicted in FIG. 2, the style space engine 130 can process the original image 112 and the expressive image 114 using the style space encoder 132 to generate an original embedding 210 and expressive embedding 220, e.g., in the style space. Likewise, as depicted in FIG. 2, the style space encoder 132 can be the first encoder-decoder block of a pretrained StyleGAN.

The style space engine 130 can process each of the one or more image pairs including a corresponding respective original 112 and expressive image 114 to generate the initial overall linear separation editing vector 340 for all of the image pairs. In particular, the engine 130 can employ the method 130 to assign class labels to the embeddings, e.g., the original embedding 210 can be assigned a label of 0 310 and the expressive embedding 220 can be assigned a label of 1 320, for each of the image pairs. The style space engine 130 can then determine a normal vector separating the original embeddings 210 with label 0 310 from the expressive embeddings 220 with label 1 320 to generate the initial overall linear separation editing vector 340, e.g., using a support vector machine, linear discriminant analysis, Rosenblatt's perceptron learning algorithm, etc.

In the particular example depicted, the style space engine 130 can determine the normal vector separating the original embeddings 210 and the expressive embeddings 220 as the initial overall linear separation editing vector 340 by using a support vector machine (SVM) 330 to perform binary classification. In particular, the style space engine 130 can maximize the width w of a margin as the normal vector between the original embeddings 210 and the expressive embeddings 220 as the initial overall linear separation editing vector 340. The initial overall linear separation editing vector 340 can then be optimized using gradient optimization, as will be covered in more detail in FIG. 4.

More specifically, in the case that the original embeddings 210 and the expressive embeddings 220 are linearly separable, the style space engine 130 can use linear SVM, e.g., by maximizing w and determining bias parameter b such that $wx+b \geq 1$ for all of the embeddings x of a first class, e.g., the original embeddings 210, and $wy+b \leq -1$ for all of the embeddings y of the second class, e.g., the expressive embeddings 220. In the case that the embeddings 210 and 220 are not linearly separable, the style space engine 130 can apply one or more kernel transformations, e.g., using a polynomial or radial basis function kernel transformation, in order to map the embeddings into a kernel space in which the original embeddings 210 are linearly separable from the expressive embeddings 220.

Figure 4:
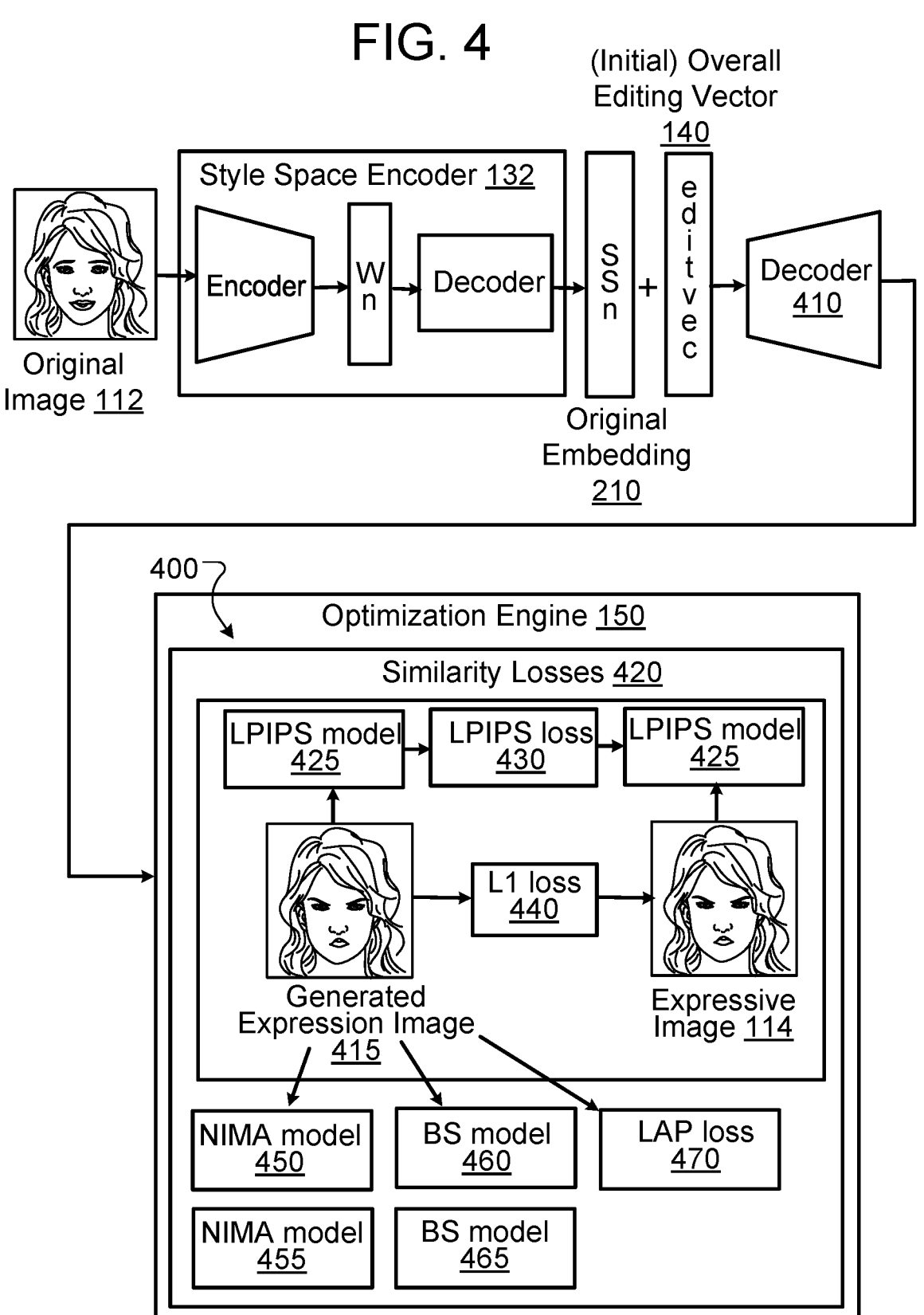
FIG. 4 is a block diagram that demonstrates an example method for optimizing an overall editing vector using gradient optimization.

FIG. 4 is a block diagram that demonstrates an example method for optimizing an overall editing vector using gradient optimization with a set of one or more losses based on a corresponding set of optimization criteria. As an example, the gradient optimization subsystem 130 of FIG. 1 can perform the method 400 to evaluate the overall editing vector, e.g., the overall mean difference editing vector 240 of FIG. 2 or the overall linear separation editing vector 340 of FIG. 3, as the optimized overall editing vector 180 using the optimization engine 150.

In particular, the initial overall editing vector 140 can be generated and steered, e.g., updated according to a set of losses based on the corresponding set of optimization criteria, e.g., quality criteria, in the embedding style space using gradient optimization. More specifically, the optimization engine 150 can update the (initial) overall editing vector 140 over a sequence of iterations using gradient optimization according to a set of losses that are based on the set of one or more quality criteria. In particular, at each iteration, the system can compute the gradients of the overall loss with respect to the editing vector and update the overall editing vector 140 based on the gradients.

The system can update the direction and magnitude of the overall editing vector 140 to increase the alignment of one or more generated expression image(s) 152, e.g., images generated as a result of applying the overall editing vector 140 to the original image 112 at the current iteration of gradient optimization, with the set of quality criteria. In some cases, the gradient optimization process can include using one or more tunable loss models or loss weight parameters that can enable direct control over the optimization of the overall editing vector, e.g., through direct user feedback with respect to an intermediate generated expression image 415 or the automated tuning of hyperparameters.

After the style space engine 130 has generated an initial overall editing vector 140, e.g., using the mean difference method 200 of FIG. 2 or normal vector method 300 of FIG. 3, the optimization engine 150 can evaluate the quality of the initial overall editing vector 140 by applying it to an embedding of the original image 112 and computing a set of losses to evaluate the quality of the generated expression image 415 that the initial overall editing vector imparts. In particular, the system can process the original image 112 using a style space encoder model 132, e.g., the style space encoder model 132 used to generate the initial overall editing vector 140, to embed the original image as an original embedding 210 in the style space. The system can then apply the initial overall editing vector 140 to generate a generated expression embedding that can then be decoded, e.g., using the decoder 410, to generate a generated expression image 415 for the initial overall editing vector 140.

The optimization engine 150 can compute a set of losses using the generated expression image 415. As an example, the set of one or more losses 160 can include a regularization loss, a Laplacian loss indicative of a measure of image sharpness, and a perceptual patch image loss as a measure of matching content between the generated expression image 415 and the expressive image 114. As a further example, the set of one or more losses 160 can include one or more of a quality loss, e.g., a quality loss generated by a neural image assessment model, and a facial transition loss generated by a blend shape model. More specifically, at each iteration in a sequence of optimization iterations, the system can generate a generated expression image 415 with the overall editing vector 140 as described above, compute the set of losses for the image 415, and update the overall editing vector 140 using gradients of the overall loss.

In the particular example depicted, the optimization engine 150 includes both loss calculators and loss models. For example, the loss evaluator 154 can include a loss calculator that can compute different losses, e.g., the L1 regularization loss 440 and the Laplacian (LAP) loss 470. As another example, the loss evaluator 154 can include a subset of loss models configured to process the generated expression image 415 and the corresponding face image 114, e.g., to compute one or more similarity scores using the learned perceptual image-patch similarity (LPIPS) model 425, and a subset of loss models configured to process the generated expression image 415, e.g., to evaluate the technical quality of the generated expression image 415 using the neural image assessment (NIMA) model 450 and blend shapes (BS) model.

In particular, the engine 150 can compute a set of similarity losses 420 with respect to the corresponding expressive image 114 for each processed original face image 112. In the particular example depicted, the similarity losses 420 can include a regularization loss, e.g., the L1 regularization loss 440, and a learned perceptual image-patch similarity (LPIPS) loss 430.

The regularization loss, e.g., the L1 loss 440, represents a distance between the pixels of the generated expression image 415 and the expressive image 114. In some cases, the images can be brightened, e.g., using regional expression image brightening from segmentation classes computed using a segmentation model before calculating the regularization loss.

The LPIPS loss 430 represents a matching of content, e.g., as opposed to pixels, between the two images 415 and 114. More specifically, the optimization engine 150 can process the generated expression image 415 and the expressive image 114 using an LPIPS model 425, e.g., a pretrained learned perceptual image patch similarity model to output a representation of image patches, e.g., activations of image features, that can then be compared between the two images 415 and 114. In some cases, the image features can be predetermined using a face segmentation model to generate a mask for different face segments in the corresponding original image, which can then be applied to the generated expression image 415 and expressive image 114 to identify different face segments as image patches. For example, computing the LPIPS loss 430 can involve subtracting the representation of image patches generated by the LPIPS model 425 for the expressive image 114 from the representation of image patches generated by the LPIPS model 425 for the generated expression image 415.

Additionally, the optimization engine 150 can compute a set of one or more losses based on the generated expression image 415, e.g., based on the generated expression image 415 without comparison to another image. As an example, the optimization engine 150 can compute a Laplacian loss 470 by convolving the generated expression image 415 with a Laplacian filter kernel to estimate the sharpness of the image 415. As another example, the engine 150 can evaluate the technical quality, e.g., a measure of aesthetic quality based on the presence of noise and artifacts in the image, using a neural image assessment model (NIMA) 450 to generate a NIMA loss 455. In particular, the NIMA model 450 can process the generated expression image 415 to predict a quality score of the image 415, and then penalize low quality scores in the NIMA loss 455.

As yet another example, the optimization engine 150 can process the generated expression image 415 using a blend shape (BS) model 460 to generate a probability of facial phase transition for each of a number of facial landmarks. More specifically, a probability of facial phase transition can refer to the extent to which a facial feature, e.g., the left eyebrow of the face in the generated expression image 415, is performing an action, e.g., is raised. In particular, the BS model 460 can be a regression model that parametrizes any facial phase transition as a combination of continuous values for multiple facial features. The engine 150 can compute the BS loss 465 by defining ground truth values for each facial feature and phase transition, e.g., in the target photo expression effect, and comparing the corresponding values for each facial feature and phase transition for the generated expression image 415.

In some cases, the BS model 460 can be a tunable loss model. For example, the BS model 460 can contain a set of blend shapes, e.g., combinations of facial features and actions, whose weights can be adjusted, e.g., manually by a user or using hyperparameter tuning. As an example, the set of blend shapes can include values that determine the probability of the left eyebrow of the face being turned down or lifted up, the left nostril being sneered, the mouth being puckered, the right eyebrow being turned down or lifted up, etc.

In particular, in the case in which the system supports a human-in-the-loop, the system can enable a user to alter the values of the blend shapes using the BS model 460. In some cases, the user can alter the values to generate an expression that was not represented in the input pairs of images processed to generate the initial overall editing vector. For example, the user can maximize the value of a particular facial feature phase transition to generate a unique extreme or theatrical expressive effect that can evoke amusement.

The gradient optimization subsystem 120 can use the computed losses to perform gradient optimization of the overall editing vector 140 with respect to a loss function over a sequence of iterations. In the particular example depicted, the loss function can include loss weight parameters to control the magnitude of the losses computed by optimization engine 150. For example, the loss used can be the total loss: $\lambda_1 \text{LPIPS} + \lambda_2 \text{L1} + \lambda_3 \text{LAP} + \lambda_4 \text{NIMA} + \lambda_5 \text{BS}$, where $\lambda_1$, $\lambda_2$, $\lambda_3$, $\lambda_4$, and $\lambda_5$ are the loss weight parameters. More specifically, the extent to which a particular loss impacts the direction that the initial overall editing vector 140 is being steered, e.g., updated, in the embedding style space depends on the relative weights $\lambda_1$, $\lambda_2$, $\lambda_3$, $\lambda_4$, and $\lambda_5$ for a given optimization iteration.

The values of the loss weight parameters can be tuned using hyperparameter tuning, e.g., the subsystem 120 can determine the magnitude of the losses with respect to one another in accordance with the set of optimization criteria. As an example, the loss weight parameters can be tuned using an automated grid search, random search, Bayesian optimization, etc. with respect to a hyperparameter objective function. In particular, the subsystem 120 can determine an objective function that can be maximized, minimized, used to define allowable values for each of the set of quality criteria, etc. For example, the set of quality criteria can include a specification of allowable image sharpness, the presence of artifacts, and expected face transitions for one or more face features based on the target expression photo editing effect, and the system can search for the loss weight parameters that maximize the image sharpness, minimize the presence of artifacts, and satisfy the allowable values for the expected face transitions for each of a number of face features.

As another example, the loss weight parameters can be tuned using a human-in-the-loop. In particular, since evaluating the quality of the target photo expression in the generated expression image 415 can be subjective, the system can allow a user to set the loss weight parameters. In some cases, the human-in-the-loop process can involve the user setting the loss weight parameters directly. In other cases, the human-in-the-loop process can involve the user assigning scores to the generated expression image 415 with respect to the quality criteria and the system deriving the loss weight parameters based on a constraint that the sum of the loss weight parameters be equal to a constant. In this case, the system can allocate the loss weight parameters according to correcting any aesthetic biases based on the assigned scores of the user. For example, if the generated expression image 415 is blurry according to the score the user assigned, the system can increase the loss weight parameter corresponding to the Laplacian loss while decreasing one or more of the other loss weight parameters to satisfy the constraint.

The gradient optimization subsystem 120 can perform the method 400 over a number of gradient optimization iterations to generate the optimized overall editing vector. In particular, the system can optimize the overall editing vector 140 for one or more original images 112, e.g., in order to ensure that the optimized overall editing vector imparts the target expression photo effect in each of the original images 112. At each iteration, the system can compute the gradients of the overall loss for the generated expression image 415 with respect to the overall editing vector 140 and update the vector 140 based on the gradients. More specifically, the system can continually update the overall editing vector 140 until a termination criterion is met, e.g., a termination criterion based on the total loss being bounded by a threshold, or a predetermined number of gradient optimization iterations.

Figure 5:
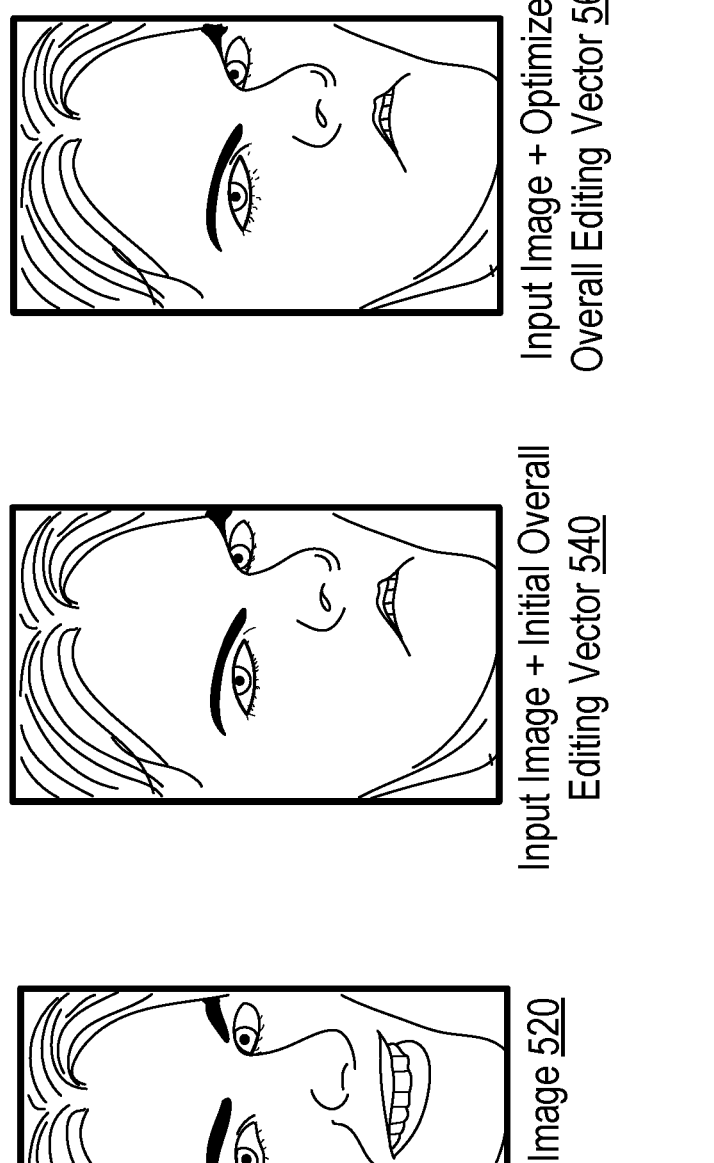
FIG. 5 illustrates how gradient optimization can result in a high-quality target expression image when applying the optimized overall editing vector.

FIG. 5 illustrates how performing gradient optimization can result in a high-quality target expression image, e.g., after applying the optimized overall editing vector. In particular, FIG. 5 compares an intermediate generated expression image 540 from applying an initial overall editing vector to the input image 520 with the target expression face image from applying an optimized overall editing vector 560. In this case, the target expression of the target photo expression effect is an angry facial expression.

More specifically, the system can apply the initial overall editing vector generated by the style space engine, e.g., the initial overall editing vector 140, to the embedding of the original image 520 in style space to generate a generated expression embedding and can decode the generated expression embedding into the corresponding generated expression image 540 using a decoder model, e.g., a decoder configured to process the embedding in style space and generate the generated expression image 540. As depicted in FIG. 4, the system can use the optimization engine to provide one or more losses, e.g., based on the generated expression image 540, to optimize the initial overall editing vector 140 in order to generate the optimized editing vector, e.g., the optimized overall editing vector 180. Likewise, the system can apply the optimized overall editing vector to generate the target expression face image 560.

The image 560 improves on the image 540, e.g., gradient optimization corrects for several aesthetic biases encoded by the initial overall editing vector. As an example, the aesthetic biases can come from the input image pairs used to generate the initial overall editing vector. In particular, the generated expression image 540 is blurrier than the target expression face image 560, e.g., the region of the image around the eyes in 540 is less sharp than the region around the eyes in the input 520. For example, the blurriness can be corrected for using a measure of sharpness loss, e.g., the Laplacian loss of FIG. 4. Additionally, the region around the cheeks and chin has less detail than the input image 520. For example, the lack of detail can be corrected for using a quality loss, e.g., the NIMA loss of FIG. 4.

Furthermore, some of the facial features have been altered in unexpected ways based on the target angry expression, e.g., the nose is less pronounced in the generated expression image 540 and the eyebrows are thinner than in the input 520. In particular, the unexpected change of features can be corrected for using a loss based on the probability of facial feature transitions, e.g., the blend shapes loss of FIG. 4.

More specifically, gradient optimization can ensure any aesthetic biases introduced by the input image pair(s), which can lead to unwanted effects, e.g., the blurriness, lack of detail, etc. in the generated expression image 540 when the initial overall editing vector 140 is applied to images without optimizing, are corrected for. Optimizing the overall editing vector ensures that the optimized overall editing vector can include a high-quality generalizable instruction that can be applied to the embedding of an input image to impart the desired target photo expression without confounding effects.

In particular, the ensured quality of the optimized overall editing vector enables the system to generate target expression datasets at scale, e.g., by generating optimized overall editing vectors for a number of target expressions and applying each to a dataset. Additionally, the target expression dataset can be used to train an at-edge on-device model to process input images and generate the target expression with high-fidelity on a user-device due to the ensured quality of the images in the created target expression dataset. More specifically, due to the information bottleneck inherent in the smaller number of parameters of an on-device model, any aesthetic biases present in the dataset can be amplified by the on-device model. Optimizing the initial overall editing vector with respect to a set of one or more losses based on the set of quality criteria ensures the creation of a high-quality dataset for training the on-device model to generate the target photo expression effect.

FIG. 6 is a flow diagram of an example process for generating an optimized overall editing vector. For convenience, the process 600 will be described as being performed by a system of one or more computers located in one or more locations. For example, a target expression dataset generation system, e.g., the target expression dataset generation system 100 of FIG. 1, appropriately programmed in accordance with this specification, can perform the process 600.

In particular, the system can receive one or more image pairs, each including an original and expressive face image representative of a target photo effect (step 610). As an example, the target photo effect can be an extreme or theatrical facial expression, e.g., an angry, smirking, happy, or sad facial expression.

The system can process each image pair using a style space encoder model (step 620). In particular, the system can use a style space encoder model to embed the original and expressive face image in an embedded style space in which each dimension corresponds with a style dimension that corresponds with a particular style, e.g., different distinct visual attributes, and embeddings within the embedded style space can contain values indicative of which particular styles are more or less represented by the processed image. In some cases, the style space encoder model can be an encoder of a pretrained style transfer neural network. As an example, the style space encoder can be a subset of a StyleGAN model, e.g., the first encoder-decoder block of the StyleGAN model.

The system can generate an initial overall editing vector (step 630), e.g., an editing vector that characterizes a difference between the embeddings of the original and expressive images in the style space. In particular, the system can characterize a distance between the embeddings in the style space. As an example, the system can subtract the embedding of the original image from the embedding of the expressive image as an editing vector and calculate a mean of the editing vectors as the initial overall editing vector. As another example, the system can determine a normal vector separating a hyperplane between the embeddings of the original face images and the embeddings of the expressive face images, e.g., a using support vector machine to perform binary classification, as the initial overall editing vector.

The system can then optimize the initial overall editing vector in accordance with one or more optimization criteria (step 640). In particular, the system can optimize the initial overall editing vector by performing gradient optimization over a sequence of gradient optimization iterations using a set of one or more losses corresponding with a set of quality criteria. For example, the quality criteria can include a specification of allowable image sharpness, the presence of artifacts, and expected face transitions for one or more face features based on the target expression photo editing effect.

More specifically, the system can embed the original face image in the style space, e.g., using the style space encoder model, apply the overall editing vector for the particular gradient optimization iteration, decode the resultant generated expression image using a decoder model, and compute the set of losses. As an example, the set of losses can include one or more of a regularization loss, a Laplacian loss indicative of a measure of image sharpness, and a perceptual patch image loss as a measure of matching content between the intermediate expression image and the target expression image. As a further example, the set of one or more losses 160 can include one or more of a quality loss, e.g., a quality loss generated by a neural image assessment model, and a facial transition loss generated by a blend shape model.

The computed set of losses can then be applied to update the overall editing vector, e.g., by using the gradient of the loss with respect to the editing vector to steer the magnitude and the direction of the overall editing vector in accordance with the optimization criteria. The update process can continue over the sequence of gradient optimization iterations, e.g., until a termination criterion is met, e.g., a termination criterion based on the total loss of the combined loss(es) 160, or a predetermined number of gradient optimization iterations.

The system can apply the optimized overall editing vector to an input image to generate a target expression face image (step 650). In particular, the system can apply the optimized overall editing vector to one or more input images, e.g., as part of an image dataset. More specifically, the system can embed the one or more input images included in the image dataset in a style space, e.g., using the style space encoder, apply the optimized overall editing vector to the embedding of the input images, and can decode the result using a decoder model, e.g., the decoder model used to evaluate the generated expression images during gradient optimization.

In some cases, the system, or another training system, can use the one or more generated target expression face images to train a downstream model to produce the particular target expression photo editing effect. As an example, the system can produce one or more of a dataset of paired original and angry, smirking, happy, or sad face images, respectively. The system, or another training system, can then configure and train different downstream models to process an input image and generate a respective specific target expression photo effect for each of the target expression datasets. In some cases, the models can be at-edge models for deployment on resource-constrained user devices that can be trained to generate the target expression with high fidelity using the target expression datasets.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving a plurality of image pairs, wherein each image pair comprises an original face image of a face and an expressive face image representative of a target expression photo editing effect applied to the face;

generating an initial overall editing vector, wherein generating the initial overall editing vector comprises processing each image pair using a style space encoder model to generate an embedding of the original face image and an embedding of the expressive face image in an embedding space;

optimizing the initial overall editing vector in accordance with one or more optimization criteria to generate an optimized overall editing vector; and applying the optimized overall editing vector to an input face image to generate a target expression face image that has the target expression photo editing effect.

Embodiment 2 is the method of embodiment 1, wherein, for each image pair, the original face image in the image pair has been edited to generate the expressive face image in the image pair.

Embodiment 3 is the method of any one of embodiments 1-2, wherein the embedding space comprises a plurality of style dimensions, wherein each style dimension represents characteristics of a respective facial expression type.

Embodiment 4 is the method of any one of embodiments 1-3, wherein the style space encoder model is an encoder of a pretrained style transfer neural network.

Embodiment 5 is the method of any one of embodiments 1-4, wherein generating the initial overall editing vector further comprises determining a respective editing vector for each image pair characterizing a difference between the embedding of the original face image from the embedding of the expressive face image.

Embodiment 6 is the method of embodiment 5, further comprising, for a respective plurality of editing vectors corresponding with the plurality of image pairs, calculating a mean of the plurality of editing vectors as the initial overall editing vector.

Embodiment 7 is the method of any one of embodiments 1-4, wherein generating the initial overall editing vector further comprises:

determining a normal vector separating a hyperplane between embeddings of original face images and embeddings of expressive face images for the plurality of image pairs as the initial overall editing vector.

Embodiment 8 is the method of embodiment 7, wherein determining the normal vector separating the hyperplane further comprises using a support vector machine to perform binary classification.

Embodiment 9 is the method of embodiments 1-8, wherein optimizing the initial overall editing vector in accordance with one or more optimization criteria to generate the optimized overall editing vector further comprises performing gradient optimization comprising:

processing the original face image for each image pair in the plurality of image pairs, wherein processing comprises:

using the style space encoder model to generate the embedding of the original face image in the embedding space;

applying an overall editing vector to the embedding of the original face image to generate a generated expression embedding;

decoding the generated expression embedding into a generated expression image using a decoder model;

computing a set of one or more losses based at least on a set of one or more generated expression images; and updating the overall editing vector.

Embodiment 10 is the method of embodiment 9, wherein computing the set of one or more losses based at least on a set of one or more generated expression images comprises:

computing a regularization loss with respect to each corresponding expressive face image for each processed original face image;

computing a Laplacian loss indicative of a measure of generated expression image sharpness; and using a set of one or more loss models, each configured to generate a respective loss for the generated expression image with respect to a corresponding criterion.

Embodiment 11 is the method of embodiment 10, wherein the set of one or more loss models comprises:

a first subset of loss models configured to process the generated expression image and the corresponding expressive face image to generate a first set of losses; and a second subset of loss models configured to process the generated expression image to generate a second set of losses.

Embodiment 12 is the method of embodiment 11, wherein the first subset of loss models comprises a perceptual similarity model configured to generate a learned perceptual image patch loss, wherein each patch comprises a region in each image, as a measure of matching content between the generated expression image and the corresponding expressive face image.

Embodiment 13 is the method of any one of embodiments 11-12, wherein the second subset of loss models comprises:

a neural image assessment model configured to generate a quality score indicative of at least a measure of artifacts in the generated expression image; and a blend shape model configured to generate a probability for each of a plurality of facial phase transitions for each of a plurality of facial landmarks identified in the generated expression image.

Embodiment 14 is the method of embodiment 13, wherein using the blend shape model further comprises defining a first facial phase transition by assigning one or more values to a subset of the plurality of facial landmarks identified in the generated expression image.

Embodiment 15 is the method of any one of embodiments 11-14, wherein the first and second set of losses are each multiplied with a corresponding first and second set of loss weight parameters before updating the overall editing vector.

Embodiment 16 is the method of embodiment 15, further comprising tuning the first and second set of loss weight parameters using hyperparameter tuning.

Embodiment 17 is the method of any of embodiments 1-16, further comprising postprocessing of the optimized overall editing vector using one or more of trimming, clipping, or normalization.

Embodiment 18 is the method of any one of embodiments 1-17, wherein applying the optimized editing vector to the input face image to generate a target expression face image in accordance with the target expression photo editing effect further comprises:

processing the input image using the space encoder model to generate an embedding of the input face image in the embedding space;

applying the optimized overall editing vector to the embedding of the input face image to generate a target expression face embedding; and decoding the target expression face embedding into the target expression face image using a decoder model.

Embodiment 19 is the method of embodiment 18, further comprising including the target expression face image in a dataset of target expression face images.

Embodiment 20 is the method of embodiment 19, further comprising training a student model on the dataset of target expression face images.

Embodiment 21 is the method of embodiment 20, further comprising providing the trained student model for deployment on an at-edge device to generate the target expression face images on the at-edge device.

Embodiment 22 is the method of embodiment 21, further comprising deploying the trained student model on the at-edge device.

Embodiment 23 is a system comprising: one or more computers and one or more storage devices storing instructions that are operable, when executed by the one or more computers, to cause the one or more computers to perform the method of any one of embodiments 1 to 22.

Embodiment 24 is a computer storage medium encoded with a computer program, the program comprising instructions that are operable, when executed by data processing apparatus, to cause the data processing apparatus to perform the method of any one of embodiments 1 to 22.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving a plurality of image pairs, wherein each image pair comprises an original face image of a face and an expressive face image representative of a target expression photo editing effect applied to the face;
generating an initial overall editing vector, wherein generating the initial overall editing vector comprises processing each image pair using a style space encoder model to generate an embedding of the original face image and an embedding of the expressive face image in an embedding space, wherein the embedding space comprises a plurality of style dimensions, and wherein each style dimension represents characteristics of a respective facial expression type;
optimizing the initial overall editing vector in accordance with one or more optimization criteria to generate an optimized overall editing vector; and
applying the optimized overall editing vector to an input face image to generate a target expression face image that has the target expression photo editing effect.

2. The method of claim 1, wherein, for each image pair, the original face image in the image pair has been edited to generate the expressive face image in the image pair.

3. The method of claim 1, wherein the style space encoder model is an encoder of a pretrained style transfer neural network.

4. The method of claim 1, wherein generating the initial overall editing vector further comprises determining a respective editing vector for each image pair characterizing a difference between the embedding of the original face image from the embedding of the expressive face image.

5. The method of claim 4, further comprising, for a respective plurality of editing vectors corresponding with the plurality of image pairs, calculating a mean of the plurality of editing vectors as the initial overall editing vector.

6. The method of claim 1, wherein generating the initial overall editing vector further comprises:
determining a normal vector separating a hyperplane between embeddings of original face images and embeddings of expressive face images for the plurality of image pairs as the initial overall editing vector.

7. The method of claim 6, wherein determining the normal vector separating the hyperplane further comprises using a support vector machine to perform binary classification.

8. The method of claim 1, wherein optimizing the initial overall editing vector in accordance with one or more optimization criteria to generate the optimized overall editing vector further comprises performing gradient optimization comprising:
processing the original face image for each image pair in the plurality of image pairs, wherein processing comprises:
using the style space encoder model to generate the embedding of the original face image in the embedding space;
applying an overall editing vector to the embedding of the original face image to generate a generated expression embedding;
decoding the generated expression embedding into a generated expression image using a decoder model;
computing a set of one or more losses based at least on a set of one or more generated expression images; and
updating the overall editing vector.

9. The method of claim 8, wherein computing the set of one or more losses based at least on a set of one or more generated expression images comprises:
computing a regularization loss with respect to each corresponding expressive face image for each processed original face image;
computing a Laplacian loss indicative of a measure of generated expression image sharpness; and
using a set of one or more loss models, each configured to generate a respective loss for the generated expression image with respect to a corresponding criterion.

10. The method of claim 9, wherein the set of one or more loss models comprises:
a first subset of loss models configured to process the generated expression image and the corresponding expressive face image to generate a first set of losses; and
a second subset of loss models configured to process the generated expression image to generate a second set of losses.

11. The method of claim 10, wherein the first subset of loss models comprises a perceptual similarity model configured to generate a learned perceptual image patch loss, wherein each patch comprises a region in each image, as a measure of matching content between the generated expression image and the corresponding expressive face image.

12. The method of claim 10, wherein the second subset of loss models comprises:

a neural image assessment model configured to generate a quality score indicative of at least a measure of artifacts in the generated expression image; and a blend shape model configured to generate a probability for each of a plurality of facial phase transitions for each of a plurality of facial landmarks identified in the generated expression image.

13. The method of claim 12, wherein using the blend shape model further comprises defining a first facial phase transition by assigning one or more values to a subset of the plurality of facial landmarks identified in the generated expression image.

14. The method of claim 10, wherein the first and second set of losses are each multiplied with a corresponding first and second set of loss weight parameters before updating the overall editing vector.

15. The method of claim 14, further comprising tuning the first and second set of loss weight parameters using hyperparameter tuning.

16. The method of claim 1, further comprising postprocessing of the optimized overall editing vector using one or more of trimming, clipping, or normalization.

17. The method of claim 1, wherein applying the optimized editing vector to the input face image to generate a target expression face image in accordance with the target expression photo editing effect further comprises:

processing the input image using the style space encoder model to generate an embedding of the input face image in the embedding space;

applying the optimized overall editing vector to the embedding of the input face image to generate a target expression face embedding; and decoding the target expression face embedding into the target expression face image using a decoder model.

18. The method of claim 17, further comprising including the target expression face image in a dataset of target expression face images.

19. The method of claim 18, further comprising training a student model on the dataset of target expression face images.

20. The method of claim 19, further comprising providing the trained student model for deployment on an at-edge device to generate the target expression face images on the at-edge device.

21. The method of claim 20, further comprising deploying the trained student model on the at-edge device.

22. A system comprising one or more computers and one or more storage devices storing instructions that are operable, when executed by the one or more computers to cause the one or more computers to perform operations comprising:

receiving a plurality of image pairs, wherein each image pair comprises an original face image of a face and an expressive face image representative of a target expression photo editing effect applied to the face;

generating an initial overall editing vector, wherein generating the initial overall editing vector comprises processing each image pair using a style space encoder model to generate an embedding of the original face image and an embedding of the expressive face image in an embedding space, wherein the embedding space comprises a plurality of style dimensions, and wherein each style dimension represents characteristics of a respective facial expression type;

optimizing the initial overall editing vector in accordance with one or more optimization criteria to generate an optimized overall editing vector; and applying the optimized overall editing vector to an input face image to generate a target expression face image that has the target expression photo editing effect.

23. The system of claim 22, wherein generating the initial overall editing vector further comprises determining a respective editing vector for each image pair characterizing a difference between the embedding of the original face image from the embedding of the expressive face image.

24. A non-transitory computer storage medium encoded with a computer program, the program comprising instructions that are operable, when executed by data processing apparatus to cause the data processing apparatus to perform operations comprising:

receiving a plurality of image pairs, wherein each image pair comprises an original face image of a face and an expressive face image representative of a target expression photo editing effect applied to the face;

generating an initial overall editing vector, wherein generating the initial overall editing vector comprises processing each image pair using a style space encoder model to generate an embedding of the original face image and an embedding of the expressive face image in an embedding space, wherein the embedding space comprises a plurality of style dimensions, and wherein each style dimension represents characteristics of a respective facial expression type;

optimizing the initial overall editing vector in accordance with one or more optimization criteria to generate an optimized overall editing vector; and applying the optimized overall editing vector to an input face image to generate a target expression face image that has the target expression photo editing effect.

* * * * *